United States Patent [19]

Bauman et al.

[11] 3,897,301

[45] July 29, 1975

[54] RECOVERY OF PAPERMAKING SOLIDS FOR REUSE, WITH AN ACTIVE CHLORINE-BEARING CHEMICAL

[75] Inventors: Harry D. Bauman, Glen Rock; L. Richmond Lutz, III, York, both of Pa.

[73] Assignee: P. H. Glatfelter Co., Spring Grove, Pa.

[22] Filed: Apr. 1, 1974

[21] Appl. No.: 456,770

[52] U.S. Cl. .................. 162/189; 162/87; 162/190; 162/DIG. 9
[51] Int. Cl.² ........................................... D21F 1/66
[58] Field of Search .. 162/189, 190, 88, 87, DIG. 9, 162/6

[56] References Cited
UNITED STATES PATENTS

| | | | |
|---|---|---|---|
| 1,737,330 | 11/1929 | Pattillo et al. | 162/190 X |
| 1,990,942 | 2/1935 | Henderson | 162/88 |
| 3,220,546 | 11/1965 | Gardner | 162/189 X |
| 3,833,468 | 9/1974 | Boniface | 162/189 X |

*Primary Examiner*—S. Leon Bashore
*Assistant Examiner*—Richard V. Fisher
*Attorney, Agent, or Firm*—Christen & Sabol

[57] ABSTRACT

Fillers and fine fibers are reclaimed from a paper mill sewer in a process involving dewatering and chemical treatment, using an active chlorine-bearing chemical, such that the drainage rate of the reclaimed fine fibers and filler is vastly improved. The mixture of filler and fine fibers can then be recycled to the paper mill for reuse without a decrease in production rate, as would otherwise occur because of poor drainage of the fine fibers and filler, and without lowering of paper quality. This ability to reuse reclaimed materials comprises an important reduction in environmental pollution and a significant reduction in the waste of raw materials.

4 Claims, No Drawings

3,897,301

RECOVERY OF PAPERMAKING SOLIDS FOR REUSE, WITH AN ACTIVE CHLORINE-BEARING CHEMICAL

BACKGROUND OF THIS INVENTION

1. Field of This Invention

This invention relates to a process of recovering and treating the filler and fiber-fines of the sewage from a paper-making machine. This invention further relates to a process of treating such fiber-fines and filler to give them a higher drainage rate. This invention still further relates to a process of recycling such treated fiber-fines and filler into paper making without the loss of production rate.

2. Prior Art

Large quantities of valuable solids are lost daily to the paper mill sewer in the production of papers in which the major components of the feed, usually called the furnish, to the paper machines are good quality cellulose pulp and inorganic fillers. The paper furnish, as a very dilute aqueous suspension, is fed to the sheet forming section of the paper machine, usually a fine meshed wire moving rapidly across suction devices. As the water drains through the wire, normally 20 to 30 percent and sometimes as much as 50 percent of the suspended solids are carried with it. The mixture of water and suspended solids which drains through the wire is called white water. The loss of solids in the white water is too great to commercially accept. Therefore, white water is sent to a device called a save-all in which the suspended solids are recovered by flotation or settling or filtering and are then returned to the paper machine system. However, save-alls are not 100 percent efficient and there are many other lesser avenues, in addition to white water, by which furnish ingredients may reach the sewer. Even in the best operated paper mills, i.e., the "tightest," solids lost to the sewer rarely go below 5 percent of the paper production. This means that a mill producing 500 tons of paper per day probably cannot avoid losing about 25 tons per day of valuable furnish ingredients.

A loss of solids of this magnitude not only represents a monetary loss to the mill measured in hundreds of thousands of dollars annually, but also poses a serious pollution problem. Until recently only the most progressive paper mills had installed primary waste treatment to prevent discharging these suspended solids to a body of water, where the result was a massive bottom deposit which was noisome, ecologically damaging, and esthetically displeasing. Governmental agencies now require all mills to provide primary treatment. But primary waste treatment does not solve the problem of how to dispose of these solids from the paper making process; it only concentrates the solids and transfers their disposal from one area to another. All the methods presently available for handling the solids from primary treatment regard them as an annoying, but unavoidable, waste product. A mill must add additional hundreds of thousands of dollars annually, as the cost of their disposal, to the significant initial value of the fiber and filler in the solids.

Several approaches have been tried to develop less costly means or useful means for disposing of the paper machine solids recovered in primary waste treatment. They have been tested for making molded articles like egg cartons, but their slow drainage rate is undesirable. They have been tried as supplemental ingredients in corrugating papers and in roofing felt, but their high ash content and slow drainage are stumbling blocks.

The term drainage time or drainage rate as used herein is probably peculiar to industries working with paper-making cellulose fibers. Drainage time is the number of seconds required for a charge of furnish to form a mat on a wire cloth in a laboratory sheet making machine, timed from the instant of opening the drain valve to the instant the water disappears from the mat. It is precisely defined and the method for measuring it is given in TAPPI Standard Method T221 os –63. The drainage time of a pulp or paper furnish is a critical characteristic. If the drainage rate is slow, i.e., the drainage time is long, it is relatively difficult to remove water from the furnish on the wire of the paper machine. The speed of the paper machine must then be reduced to afford longer drainage time on the wire, resulting in a serious reduction in tons of paper produced per day. Obviously, paper producers favor fast draining furnishes because they afford the maximum paper production, and mill managers are reluctant to introduce into the furnish ingredients which significantly slow the drainage. Cellulose fibers differ markedly in their drainage rates.

We have categorized the components of the suspended solids in the paper mill sewer as (a) long fibers, (b) fiber-fines, i.e., short fibers and fiber debris, and (c) inorganic fillers, such as, clay, $TiO_2$, sodium or calcium alumino-silicates, $CaCO_3$, etc. The long fibers have excellent drainage characteristics while the fiber-fines drain very slowly; and the fillers also slow drainage, but to a much lesser degree than fiber-fines. Because of the preponderance of fiber-fines and filler in the solids recovered from a paper mill sewer, the drainage of the composite entity is poor and has defeated previous attempts to use it in paper products.

In order to reclaim the fillers for recycle to the papermill without the disadvantage of the slow drainage of the fiber fines, studies have been conducted on destroying the fibrous components of the suspended solids recovered in primary waste treatment. This can be done by calcining the solids in a furnace or kiln. But the high temperature of calcining changes the physical structure of clay, thereby increasing its abrasiveness so greatly that it cannot be used as a paper filler. Calcining has a further serious disadvantage in that, unless the temperature is very carefully controlled, $CaCO_3$ in the recovered solids is decomposed to quick lime, $CaO$. The resulting high alkalnity of the calcined reclaimed solids makes them unsuitable for reuse in paper. German Auslegeschrift 2,256,581, May 30, 1973, U.S. application Ser. No. 201,397, Nov. 23, 1971, now abandoned, by Sterling Drug Inc., describes a process for destroying the fiber-fines by wet oxidation which operates at relatively low temperature and so avoids the problems of rendering the clay abrasive and of decomposing the $CaCO_3$. However, both calcining and wet oxidation are expensive processes and both destroy the fibrous components, which themselves have significant inherent value, at least equal to the value of the fillers.

STATEMENT OF THIS INVENTION

An object of this invention is to afford a process by which long fibers, fiber-fines, and filler lost to the paper mill sewer can be recovered and recycled without any of the difficulties or disadvantages described above. Another object of this invention is to afford a process for recovering and treating the filler and fiber-fines of the sewage from a paper-making machine. A further object of this invention is to afford a process for treating such fiber-fines and filler to give them a higher drainage rate. A still further object of this invention is to afford a process for recycling such treated fiber-fines and filler into paper making without the loss of production rate.

Other objects and advantages of this invention will be apparent to those ordinarily skilled in the art from this application.

We have unexpectedly discovered that a particular chemical treatment of the fiber-fines and filler so improves their drainage that they can be recycled and introduced into virgin furnishes without the need to reduce paper machine speed and without a resultant lowering paper quality. Our invention fulfills all of the above objects and has all of the desired advantages expressed herein. For example, the chemically-treated filler and fiber-fines concentrates of this invention are not subject to microorganism attack and decomposition over long periods of storage.

Broadly this invention involves a process which includes separating an admixture of water, fiber-fines and inorganic fillers from the sewage of a papermaking process. Some long fibers are usually present in the admixture and preferably the long fibers are removed from the admixture before the subsequent partial dewatering step. The admixture is then partially dewatered. The admixture is reacted with an active chlorine-bearing chemical, whereby the drainage rate of the admixture of fiber-fines and fillers is improved. The preferred active chlorine-bearing chemical is sodium hypochlorite. The treated admixture is typically used as part of the furnish or feed in a papermaking machine without the loss of production rate (of making paper).

More narrowly, this invention involves a process which includes separating an admixture of water, fiber-fines and inorganic fillers from the sewage of a papermaking process. Preferably the long fibers present in the admixture are removed from said admixture before the subsequent partial dewatering step. The admixture is then partially dewatered to a water content of from about 5 percent to about 25 percent solids. The admixture is reacted at ambient temperature under gentle agitation for from about 4 hours to about 72 hours with enough active chlorine-bearing chemical to provide from about 10 to about 50 grams of active chlorine per pound of solids in the admixture, whereby the drainage rate of the admixture is improved. The preferred active chlorine-bearing chemical is sodium hypochlorite. The treated admixture is typically used as part of the furnish or feed in a papermaking machine without the loss of production rate.

The best mode to apply our invention to improve the drainage of the fiber-fines and filler and recycle them for use in the paper mill, will differ slightly with each individual mill situation, but we have described it basically herein. The steps described below have worked well in one particular mill, with the chemical treatment in step 4 being the main gist of this invention. Segregation of the paper mill solids, their reclamation and concentration, and their use after treatment can be accomplished in a variety of ways. A particular mill will select those best adapted to its peculiar situation. Now treating the process steps in sequence:

1. Segregation of the paper mill sewer: This should be done in such a way that essentially the only suspended solids present are those from the paper machines. Any conventional or convenient means can be used to segregate the paper mill sewage.

2. Removal of the long fibers: This can be done by using well known mechanical devices such as, for example, screens. Any conventional or convenient means can be used to remove the long fibers from the paper mill sewage. It is not imperative to remove the long fibers but there may be advantages to doing so. The material passing through such screen is a highly dilute suspension of fiber-fines and filler, typically containing about 0.05 percent of solids (4 lbs. of solids per 1,000 gal.).

3. Concentration of fiber-fines and filler: In this step the fiber-fines and filler are concentrated from, say, about 0.05 percent of solids to a preferred range of at least 5 percent of solids to as high as 25 percent of solids. Any conventional or convenient means can be used to concentrate the fiber-fines and filler. It is advantageous to concentrate to as high a solids content as is compatible with pumping and mixing costs. Generally, the fluidity varies inversely with the proportion of fiber-fines in the mixture; in a 50:50 fiber fines: filler mixture, 15 percent of solids is about the upper practical limit.

The first step in the concentrating can be done, for example, in a clarifier, such as a conventional gravity clarifier or a flotation clarifier. The solids recovered in the clarifier, at concentration level of from 0.5 to about 2 percent, can be further concentrated in a gravity thickener to a level of 5 to 8 percent. Concentration to a level of 15 percent or higher is readily done using a centrifuge or vacuum filter following the clarifier, with or without the use of a gravity thickener before use of the centrifuge or filter. The concentrated material will contain water, fiber-fines and filler(s), plus long fibers if they have not already been removed.

4. Chemical treatment with an active-chlorine bearing compound. For this treatment, which comprises the main portion of our invention and which is necessary to improve the drainage of the fiber-fines and filler mixture, a series of holding vessels equipped for mixing, gently but adequate to uniformly blend the contents of the vessel, is preferably used. Of course, a single holding vessel or similar set up can be used. In the preferred scheme, these holding vessels must be large enough to provide adequate retention time for the chemical treatment (reaction) with the active-chlorine bearing compound. The active-chlorine bearing chemical is preferably added continuously to the concentrated fiber-fines and filler mixture as it is pumped to the holding vessel (the first one when a series of holding tanks is used), although the holding vessel can be filled (e.g., adding the active chlorine-bearing chemical to the concentrated fiber-fines and filler) and treated as a batch.

The preferred source of active chlorine is sodium hypochlorite. Any source of active chlorine, or as termed sometimes herein, active chlorine-bearing chemical, can be used, and examples thereof are alkali metal hypochlorites such as, potassium hypochlorite, lithium hypochlorite and cesium hypochlorite, alkaline earth metal hypochlorites, such as, calcium hypochlorite, barium hypochlorite, beryllium hypochlorite and magnesium hypochlorite, elemental chlorine, chlorine dioxide, hypochlorous acid, etc. Enough active chlorine-bearing chemical is added to provide from about 10g. to 50g. of active chlorine per pound of solids in the reclaimed fiber-fines and filler mixture, dry basis. If the reclaimed mixture has a low solids content, it is usually necessary to add more active chlorine per pound of solids than when the mixture has a high solids content.

By active chlorine or source of active chlorine we mean any material which reacts positively in the standard analytical procedure for active or available chlorine, liberating $I_2$ from potassium iodide solution, the liberated $I_2$ being then quantitatively determined by titration with standard sodium thiosulfate as an indirect measure of the amount of active chlorine available from the material.

After addition of the active chlorine-bearing chemical, the mixture is held for at least about 4 hours under conditions of gentle mixing. No adverse results have been observed for much longer retention times after addition of the active chlorine-bearing chemical, and it is preferred to hold the treated mixture as long as practical. Typically we have allowed for handling as a batch, collecting and treating with sodium hypochlorite over a 24 hour period under gentle continuous mixing, and then holding with intermittent mixing until use on a paper machine. After the chemical treatment, risk of decomposition due to microorganisms is nil. We have held treated material for six weeks in a warm room, at 80° to 90°F., with no evidence of spoilage and with no change in its behavior on the paper machine.

With respect to temperature during the chemical treatment, we have found so little advantage to heating above ambient temperature that the extra cost is unwarranted. Batches collected and treated at 40° to 50°F. have given essentially the same results as those collected and treated at 80° to 90°F. It is self-evident that the material during collection and treatment should be kept above freezing.

5. Reuse on a paper machine. During the retention period subsequent to chemical treatment, time is afforded for analysis of the treated mixture, at least to the extent of determining the percentages of total solids, fiber-fines and filler. The reclaimed material can then be systematically introduced into paper furnishes, either before, during or after refining, so that the reclaimed filler replaces virgin filler and the reclaimed fiber-fines replaces virgin hardwood pulp. The filler can be separated from the fiber-fines by any conventional or convenient means.

Following is an example using a typical reclaimed fiber-fines and filler mixture; 50 percent of fiber-fines and 50 percent of filler.

| NORMAL FURNISH | |
|---|---|
| 1,400 lb. | pine pulp |
| 1,400 lb. | hardwood pulp |
| 935 lb. | clay |
| 3,735 lb. | total |

It was decided to take out 30 percent of the clay (280 lb.) and replace it with reclaimed filler, pound for pound. This meant adding 560 lb. of the reclaimed fiber-fines and filler mixture, which introduced 280 lb. of fiber-fines. Hence, 280 lb. of the total hardwood pulp normally used did not have to be used in making up the furnish. The composition of the furnish was:

| FURNISH USING RECLAIMED SOLIDS | |
|---|---|
| 1,400 lb. | pine pulp |
| 1,120 lb. | hardwood pulp |
| 280 lb. | fiber-fines |
| 655 lb. | clay |
| 280 lb. | reclaimed filler |
| 3,735 lb. | total |

The savings which the paper mill balances against the cost of reclaiming fiber-fines and filler is the reduced cost of virgin pulp and clay. In this example, the reclaimed material comprised 13.5 percent (560/3735 × 100) of the total furnish.

It was stated above that solids lost to the sewer average about 5 percent of the daily production in paper making plants. Therefore, it might seem logical to introduce reclaimed fiber-fines and filler as 5 percent of all furnishes. However, a papermill will probably prefer to use significantly more than 5 percent of reclaimed solids in some furnishes and none in others, for reasons instinctively apparent to skilled paper makers. At the above high extent of substitution there will be no effect on drainage rate from properly treated reclaimed fiber-fines and filler, and indeed even higher substitution is practical.

Affect of chemical treatment on drainage time:

The following results show that to an extent well above any that is likely to be used, reclaimed properly-treated fiber-fines and filler can be substituted into a furnish with no increase in drainage time. Fiber-fines and filler were recovered as described in the example set out below. The recovered material, after thorough mixing at 15 percent solids was divided into two parts. One part was treated, as described in the example set out below, with sodium hypochlorite solution (30 g./l. active chlorine) so as to provide 20 g. of active chlorine per lb. of solids. The second part was handled exactly as the first, only the addition of the sodium hypochlorite was omitted. The reclaimed material analyzed 45 percent filler and 55 percent fiber-fines.

In Table 1, Furnish A utilizes only virgin materials. In Furnishes B and C, reclaimed fiber-fines and filler comprised 25 percent of the total furnish. The reclaimed fiber-fines and filler used in Furnish B had received chemical treatment according to the process of this invention, whereas the reclaimed fiber-fines and filler used in Furnish C had not received any such treatment.

Table I

| | Furnishes | | |
|---|---|---|---|
| | A | B | C |
| pine pulp | 100 lb. | 100 lb. | 100 lb. |
| hardwood pulp | 100 lb. | 64 lb. | 64 lb. |
| clay | 66 lb. | 36 lb. | 36 lb. |
| treated fiber-fines | — | 36 lb. | — |
| treated filler | — | 30 lb. | — |
| untreated fiber-fines | — | — | 36 lb. |
| untreated filler | — | — | 30 lb. |
| total | 266 lb. | 266 lb. | 266 lb. |

The drainage times for the above furnishes measured by TAPPI Standard Method T221 os −63 were: Furnish A = 11.7 seconds; Furnish B = 12.0 seconds; Furnish C = 20.5 seconds. Within experimental error, the properly treated reclaimed fiber-fines and filler had the same drainage rate, even at 25 percent sbustitution, that it had before usage in a papermaking machine (i.e., as that of virgin fiber-fines and filler). The same material untreated had nearly double the drainage time of virgin fiber-fines and filler. Such an increase of drainage time would necessitate an intolerable slow down in production rate, hence our invention is shown to be inventive, unexpected and of large commercial advantage.

The fiber-fines and long fibers used herein are papermaking cellulose fibers.

The following example represents application of our invention in a typical mill situation. Many variations on this example are possible but the chemical treatment with a chlorine-bearing material is essential to realize the advantages of improved drainage.

EXAMPLE

The paper machine sewer was segregated and the flow sent over screens which removed the long fibers. After the screens, the paper mill effluent, containing fiber-fines and filler in suspension at from 0.03 to 0.06 percent solids, was then sent to a gravity clarifier segregated from all other mill flows.

An aliquant of the clarifier underflow, at from 0.5 to 1.5 percent solids, was continuously withdrawn and sent to a solid bowl centrifuge and dewatered to 15 to 18 percent solids. The centrifuge produced about 50 lb. of solids per hour, dry basis.

The output of the centrifuge was collected for 72 hours in a holding tank fitted with a paddle type mixer. This long collection time was needed to provide enough material for a run on a commercial paper machine. The mixer was run continuously during the collection period.

The contents of the holding tank were estimated at 3,000 lb. of dry solids. Four hundred gallons of sodium hypochlorite solution containing 30 grams per liter of available active chlorine were added and mixed at ambient temperature (50° to 60°F.) for 24 hrs. This treatment is at about 15 grams of active chlorine per pound of solids. The treated contents of the holding tank were held with occasional mixing for one more day before being used on a paper machine.

After chemical treatment, the following data were taken on the fiber-fines and filler mixture: 13.9% total solids, 55.3% filler and 44.7% fiber-fines; density 9 lb./gal.; 1.25 lb. of solids per gal.

The reclaimed and treated fiber-fines and filler mixture was used on a paper machine making a 60 lb. basis weight publication paper. During the control phase prior to use of the reclaimed material, the furnish was:

| | |
|---|---|
| 1,120 lb. | pine pulp |
| 1,680 lb. | hardwood pulp |
| 510 lb. | clay |
| 3,310 total | |

It was decided to substitute recovered filler for 33% of the clay (170 lb.). This required adding 308 lb. of reclaimed material, which also introduced 138 lb. of fiber-fines. The clay and hardwood pulp were reduced to compensate for the 308 lb. of reclaimed material added, making the furnish:

| | |
|---|---|
| 1,120 lb. | pine pulp |
| 1,542 lb. | hardwood pulp |
| 138 lb. | fiber-fines |
| 340 lb. | clay |
| 170 lb. | reclaimed filler |
| 3,310 lb. | Total |

Refining on this machine utilized a beater followed by two Jordans in series. The reclaimed material was added to each beater, about 30 minutes before the beater was dumped.

During a 4 hour control phase utilizing the normal furnish containing no reclaimed material, machine speed and drying conditions were established to meet paper specifications. When furnishes containing reclaimed material came across the machine no changes in machine speed or drying conditions were required and during an eight hour run with reclaimed materials only minor operating changes, considered normal for this paper machine, were made. The same quantities of cationic retention aid, alum, and rosin size were used per ton of paper in both phases of the run. Dirt counts were made once each hour by quality control inspectors. At all times the dirt counts were well below rejection limits and no higher when reclaimed materials were in use than during the control phase.

Data are given in Table 2.

TABLE 2

Data From Paper Machine Run

| | Phase | |
|---|---|---|
| | Control | With Reclaimed Material |
| Basis Weight | 60 lb. | 60 lb. |
| Mullen | 14 | 14 |
| Brightness | 69 | 70 |
| Opacity | 93 | 95 |
| Moisture | 4.2% | 3.8% |
| % Ash in Paper | 12.8% | 13.0% |
| First Pass Retention | 69% | 72% |
| Save-all efficiency | 98% | 98% |

What is claimed is:

1. The process which comprises separating an admixture of water, long fibers, fiber-fines and inorganic fillers from the sewage of a papermaking process, partially dewatering said admixture to a water content of from about 5 percent to about 25 percent solids, and reacting said admixture at ambient temperature under gentle agitation for from about 4 hours to about 72 hours with enough active chlorine-bearing chemical to provide from about 10 to 50 grams of active chlorine per pound of solids in said admixture whereby the drainage rate of said admixture is improved.

2. The process as described in claim 1 wherein said active chlorine-bearing chemical is sodium hypochlorite.

3. The process as described in claim 1 wherein the long fibers are removed from said admixture before said partial dewatering step.

4. The process as described in claim 1 wherein said treated admixture is used as part of the furnish or feed in a papermaking machine without the loss of production rate.

* * * * *